United States Patent [19]

Kihara

[11] Patent Number: 5,444,492

[45] Date of Patent: Aug. 22, 1995

[54] PROCESSING CIRCUIT FOR VIDEO SIGNALS OF TWO DIFFERENT ASPECT RATIOS

[75] Inventor: Taku Kihara, Kanagawa, Japan

[73] Assignee: Sony Corporation, Tokyo, Japan

[21] Appl. No.: 286,809

[22] Filed: Aug. 5, 1994

Related U.S. Application Data

[63] Continuation of Ser. No. 21,678, Feb. 24, 1993.

[30] Foreign Application Priority Data

Mar. 6, 1992 [JP] Japan .................................. 4-049721
Mar. 6, 1992 [JP] Japan .................................. 4-049722
Mar. 6, 1992 [JP] Japan .................................. 4-049723

[51] Int. Cl.[6] ........................ H04N 5/45; H04N 5/265
[52] U.S. Cl. .................... 348/445; 348/445; 348/556; 348/239
[58] Field of Search ............... 348/445, 556, 558, 913, 348/222, 239; H04N 5/265, 5/260, 5/45, 11/20, 7/01

[56] References Cited

U.S. PATENT DOCUMENTS

| | | | |
|---|---|---|---|
| 4,654,696 | 3/1987 | Dayton et al. | 358/11 |
| 4,870,509 | 9/1989 | Nagasawa et al. | 360/9.1 |
| 5,065,243 | 11/1991 | Katagiri | 358/22 |
| 5,134,479 | 7/1992 | Ohishi | 358/11 |
| 5,218,436 | 6/1993 | Sugiyama et al. | 358/11 |
| 5,231,491 | 7/1993 | Holock | 358/140 |
| 5,325,131 | 6/1994 | Penny | 348/445 |
| 5,347,318 | 9/1994 | Kobayashi et al. | 348/558 |
| 5,392,069 | 2/1995 | Koyama et al. | 348/239 |

FOREIGN PATENT DOCUMENTS

| | | | |
|---|---|---|---|
| 411440 | 2/1991 | European Pat. Off. | H04N 5/335 |
| 65576 | 3/1990 | Japan | H04N 5/265 |
| 177172 | 8/1991 | Japan | H04N 5/265 |
| 4326265 | 11/1992 | Japan | H04N 5/265 |

OTHER PUBLICATIONS

IEEE 1991 International Conference On Consumer Electronics Digest of Technical Papers 5 Jun. 1991, Rosemont, Ill., US pp. 160-161 Takuya Imaide et al 'A Digital Video Camera with an Arbitrary Aspect Ratio'.

Primary Examiner—James J. Groody
Assistant Examiner—Glenton B. Burgess
Attorney, Agent, or Firm—Jay H. Maioli

[57] ABSTRACT

A processing circuit converts a 16:9 aspect ratio video signal into a 4:3 video signal and includes a time division multiplexer that multiplexes the two video signals and a selector that selects one of the multiplexed signal for display. A mark is added to identify the range in which the 4:3 aspect ratio video signal is displayed relative to the 16:9 aspect ratio video signal.

12 Claims, 13 Drawing Sheets

PROCESSING CIRCUIT FOR VIDEO SIGNALS OF TWO DIFFERENT ASPECT RATIOS

This is a continuation of application Ser. No. 08/021,678 filed Feb. 24, 1993.

BACKGROUND OF THE INVENTION

1. Field of the Invention

This invention relates to a video camera.

2. Description of the Prior Art

While the television systems is shifting over from the current standard system of 4:3 aspect ratio (for example, NTSC system) to, for example, the EDTV (Extended Definition Television) system of 16:9 aspect ratio, which is compatible with and wider than the present standard system, both systems coexist during the shifting period.

Thus, the assignees have previously proposed a video camera for producing a signal of the wide aspect ratio television system compatible with the present standard television system. This video camera, as shown in FIG. 13 of the accompanying drawings, includes imaging devices 310 and 311 for picking up a wide aspect ratio image and an amplified and digitized version of this image is supplied to an aspect ratio converter 314 for converting the wide aspect ratio video signal produced from the imaging devices into a video signal of the present standard aspect ratio television system. Switching means 315 are provided for switching the wide aspect ratio video signal and the present standard aspect ratio television system video signal produced from the aspect ratio converter. The video signal selected by the switch means 315 is supplied to a processor 316 for processing in various ways, and is then supplied to an output 317 and an electronic viewfinder 321 for monitoring the selected aspect ratio image.

This video camera is convenient for practical use and economical since the current standard television system aspect ratio video signal and the wide aspect ratio video signal are selectively obtained by the combination of the imaging devices for picking up a wide aspect ratio image and the aspect ratio converter.

It has the drawback, however, that it cannot simultaneously produce the present standard television system aspect ratio video signal and the wide aspect ratio video signal.

OBJECTS AND SUMMARY OF THE INVENTION

An object of the present invention is to provide a video camera capable of simultaneously producing a first video signal of standard aspect ratio, and a second video signal of wide aspect ratio.

A further object of the invention is to provide a video camera capable of simultaneously producing two video signals of different aspect ratios and of discriminating the aspect ratio of the first video signal from that of the second video signal.

A further object of the invention is to provide a video camera of the above type which can easily indicate, when the first aspect ratio video signal is received, the range therein in which the second aspect ratio video signal is displayed.

According to a first aspect of the invention, there is provided a video camera including an imaging device having a photosensitive surface of a wide aspect ratio (a ratio of a lateral length to a longitudinal length, X:Y) wider than a standard aspect ratio (a ratio of a lateral length to a longitudinal length, x:y), and which produces a video signal, and also aspect ratio converting means by which the wide aspect ratio video signal from the imaging device is converted into a video signal of the standard aspect ratio.

The converting means may comprise timebase extending means which is supplied with the wide aspect ratio video signal from the imaging device that extracts a video interval xY/yX from each line signal of the wide aspect ratio video signal, and that extends the timebase by yX/xY times so as to produce the standard aspect ratio video signal.

Thus, the video camera of the invention is able to simultaneously produce the standard aspect ratio video signal and the wide aspect ratio video signal that is wider than the standard aspect ratio. In addition, it is convenient for practical use and is economical.

According to a second aspect of the invention, there is provided a video camera including an imaging device having a photosensitive surface of a first aspect ratio, aspect ratio converting means by which a video signal of the first aspect ratio fed from the imaging device is converted into a video signal of a second aspect ratio, and identification signal adding means for adding an aspect ratio identification signal to either the first aspect ratio video signal from the imaging device or to the second aspect ratio video signal from the aspect ratio converting means.

Thus the first and second aspect ratios of video signals can be discriminated by detecting the aspect ratio identification signal in the first or second aspect ratio video signal or the presence or absence thereof. Thus when the video signals are received, the horizontal size of the reproduced image can be optimized on the screen of the receiver.

According to a third aspect of the invention, there is provided a video camera including an imaging device for producing a video signal of a first aspect ratio, aspect ratio converting means by which the video signal of the first aspect ratio fed from the imaging device is converted into a video signal of a second aspect ratio, and mark signal adding means for adding to the first aspect ratio video signal from the imaging device a mark signal indicative on a display of a range in which the second aspect ratio video signal is displayed.

Thus when the first aspect ratio video signal is received, it is possible to recognize a range in which the second aspect ratio video signal is displayed.

Two embodiments, for example, a video camera for producing the NTSC system television signal and one for producing the EDTV system television signal, of the invention will be described in detail with reference to the drawings.

DESCRIPTION OF THE PREFERRED EMBODIMENTS

Figure 1:
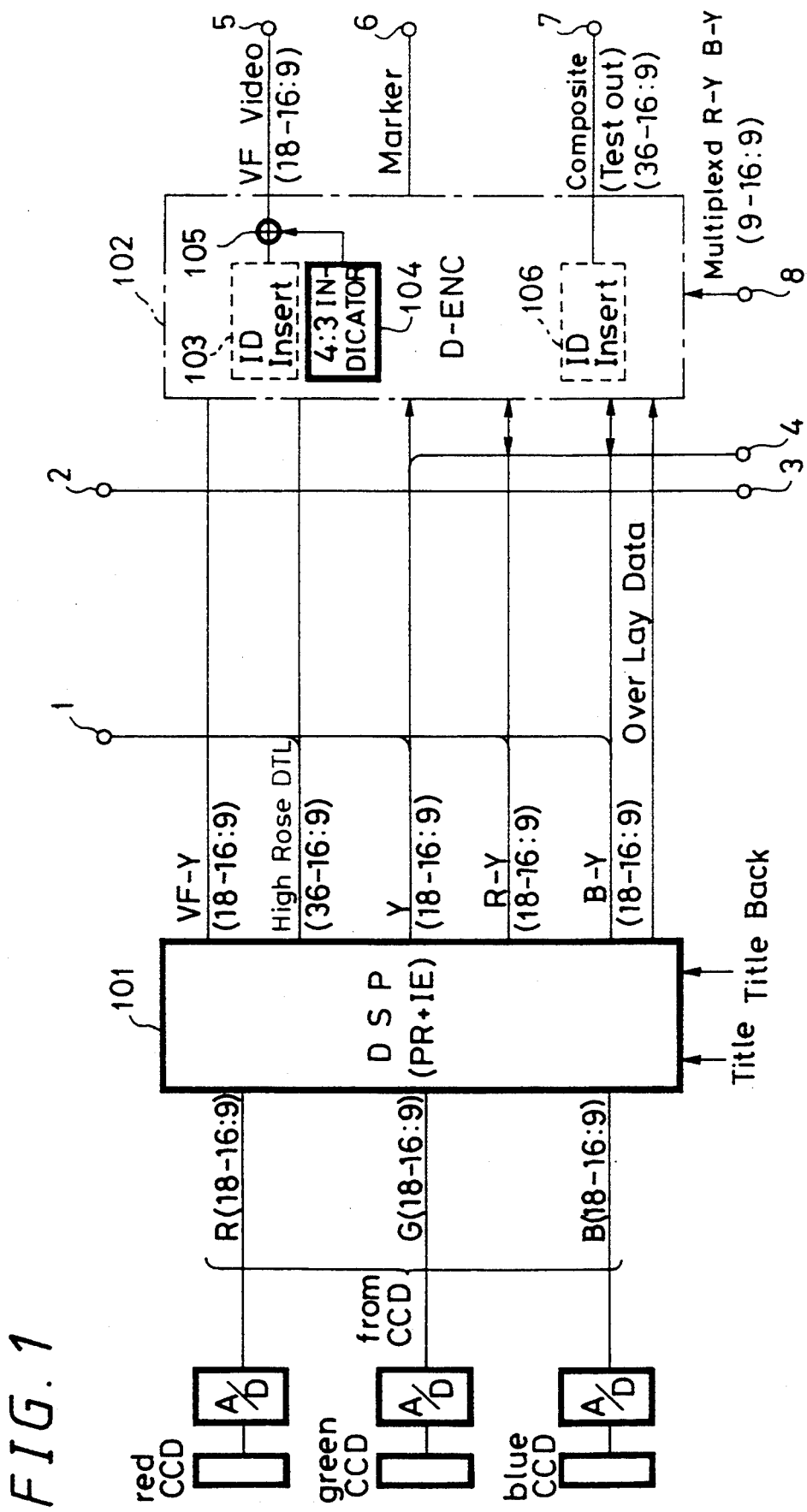
FIG. 1 is a block diagram of part of a first embodiment of the invention.

First, a video camera of a first embodiment will be described with reference to FIGS. 1 through 4. FIGS. 1 through 4 show the four sections of the video camera respectively. All or some of terminals 1–8 are provided in each of the four circuit sections shown in FIGS. 1 through 4. The terminals represented by the same reference numerals are connected to each other.

Referring first to FIG. 1, the imaging devices with 16:9 aspect ratio photosensitive surfaces, for example, red, green and blue CCDs, produce picked-up image signals, and supply them to an A/D converter, by which they are converted at a sampling frequency of, for example, 18 MHz into a digital red signal R, digital green signal G and digital blue signal B. These digital signals are supplied to a digital signal processor (DSP) 101 so as to undergo signal processing (PR) and image enhancement processing (IE). This processor 101 is also supplied with a digital title signal (Title) and a digital title back signal (Title Back). Thus, this processor 101 produces:

(1) a digital viewfinder luminance signal (VF-Y) of 18 MHz-sampling frequency and 16:9 aspect ratio;

(2) a digital high-resolution detail signal (DTL) of 36 MHz-sampling frequency and 16:9 aspect ratio;

(3) a digital luminance signal (Y) of 18 MHz-sampling frequency and 16:9 aspect ratio;

(4) a digital red color difference signal (R-Y) of 18 MHz-sampling frequency and 16:9 aspect ratio;

(5) a digital blue color difference signal (B-Y) of 18 MHz-sampling sampling frequency and 16:9 aspect ratio; and (6) a digital over lay signal (Over Lay Data). These signals are supplied to a digital encoder 102.

The digital encoder 102 produces a viewfinder digital video signal (VF Video) of 18 MHz-sampling frequency and 16:9 aspect ratio, a digital marker signal (Marker) and a test output digital composite color video signal (Composite) of 36 MHz-sampling frequency and 16:9 aspect ratio.

In the digital encoder 102, identification signal adding circuits 103, 106 add an aspect ratio identification signal of one bit indicating the 16:9 aspect ratio to the luminance signals (VF-Y) and (Y) at a predetermined line number of each vertical blanking period.

In addition and the luminance signal (VF-Y) added with the aspect ratio identification signal is supplied to an adder (which may be a multiplier) 105, by which the combined signal is added with a digital mark signal from a mark signal generator 104. This digital mark signal indicates which region of the 16:9 aspect ratio image of the video signal includes the 4:3 aspect ratio image of the video signal. The aspect ratio conversion is performed by a FIFO memory 126 functioning as a timebase converter, which will be described later with reference to FIG.3. The adder 105 produces a digital video signal (VF Video) including the mark signal.

Figure 9A:
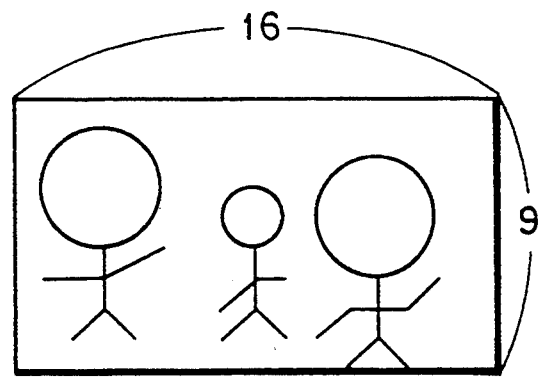
FIG. 9 is a diagram showing how to display the images of different aspect ratios.
Figure 9B:
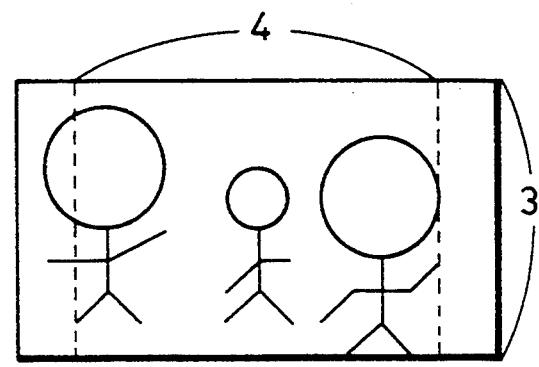
Figure 9C:
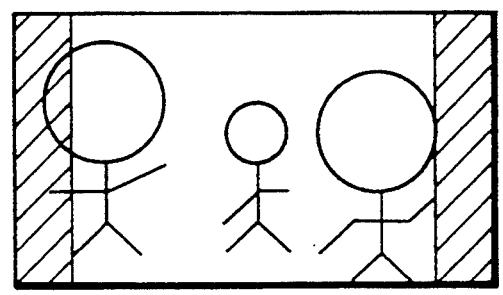

FIG. 9A of FIG. 9 shows a reproduced 16:9 aspect ratio image. FIG.9B shows this reproduced 16:9 aspect ratio image and two left and right vertical straight broken lines (of black and white or certain-colors) by which it is indicated that the reproduced 4:3 aspect ratio image is included therebetween in the 16:9 aspect ratio image. FIG.9C shows that the reproduced 4:3 aspect ratio image is the remainder of the subtraction of the shaded left and right vertical stripes (black and white or certain color bands) from the reproduced 16:9 aspect ratio image.

Figure 10A:
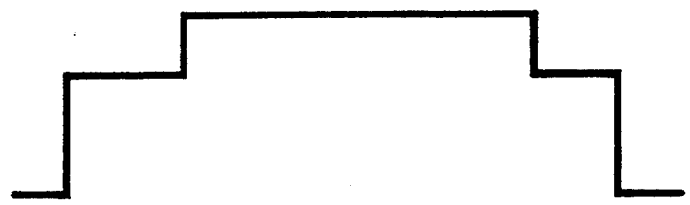
FIG. 10 is a waveform diagram of video signals including signals to be displayed.
Figure 10B:
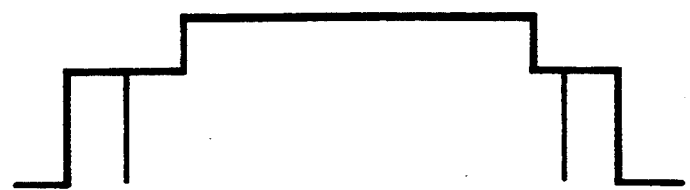
Figure 10C:
Figure 10D:
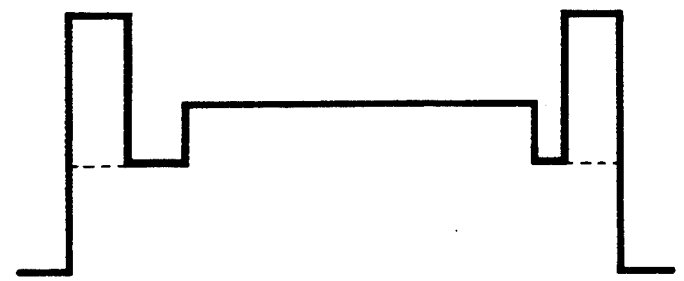

FIG. 10A of FIG. 10 shows a line signal of the video signal, for example, the luminance signal. FIG. 10B shows a line signal of the luminance signal including the mark signal for the black broken lines of FIG. 9B. FIG. 10C shows a line signal of the luminance signal including the mark signal for the stripes of FIG. 9C. FIG. 10D shows a line signal of the luminance signal including the mark signal for the white bands.

Figure 2:
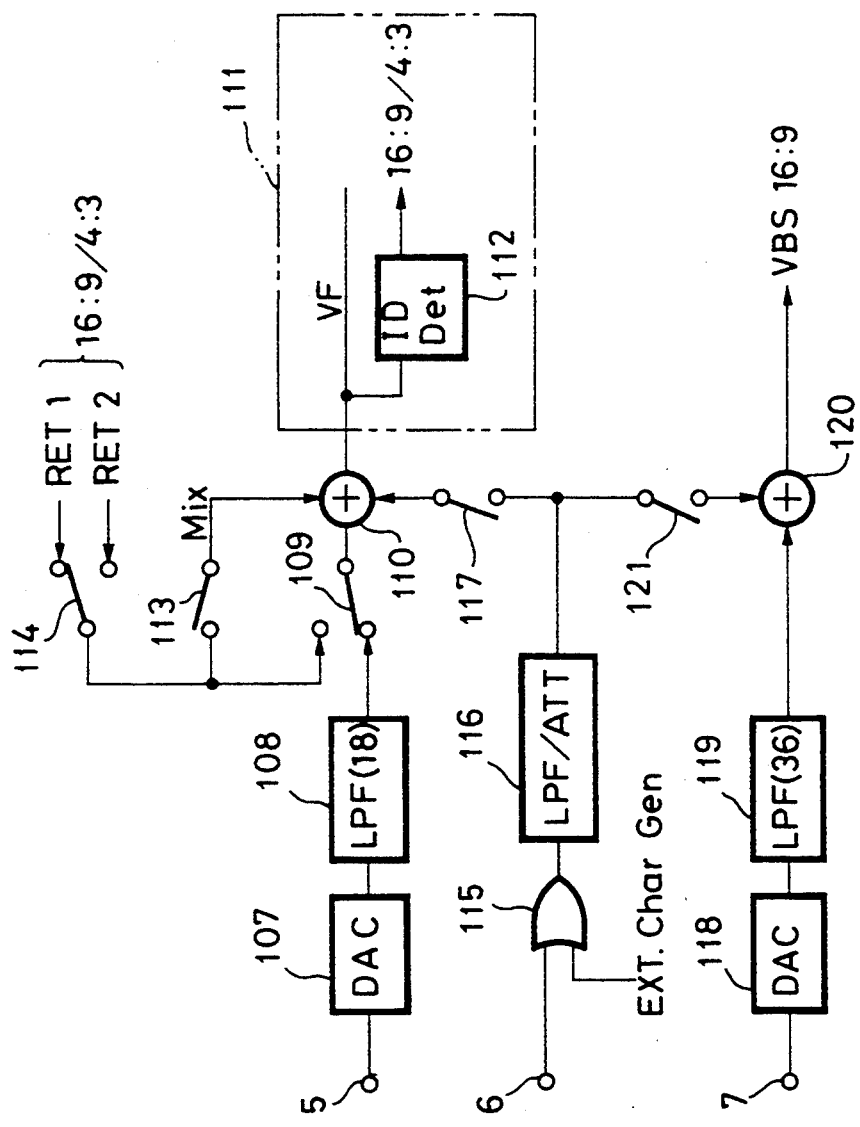
FIG. 2 is a block diagram of another part of the embodiment of FIG. 1.

Another part of the embodiment will be described with reference to FIG. 2. The viewfinder digital video signal (VF Video) from the digital encoder 102 shown in FIG. 1 is supplied to a D/A converter 107 by which it is converted into an analog signal. This viewfinder analog video signal is supplied through a low-pass filter 108 of which the cutoff frequency is 18 MHz, and through a change-over switch 109 to an adder 110. The marker signal (Marker) from the digital encoder 102 is supplied to an OR gate 115, and a digital character signal from an external character signal generator (not shown) is supplied to the OR gate 115. The character signal from the output thereof is supplied through a low-pass filter/attenuator 116 and an on-off switch 117 to the adder 110, where it is added to the output signal from the change-over switch 110. One of the return video signals (a broadcast video signal, a reproduced video signal from a VTR and so on) having the aspect ratios 16:9 and 4:3, respectively is selected by a change-over switch 114, and supplied through an on-off switch 113 to the adder 110. The output from the adder 110 is supplied to a viewfinder (for example, a CRT receiver) 111, and an identification signal detector 112 of the viewfinder 11 detects the presence or absence of the identification signal of 16:9 aspect ratio.

Figure 11:
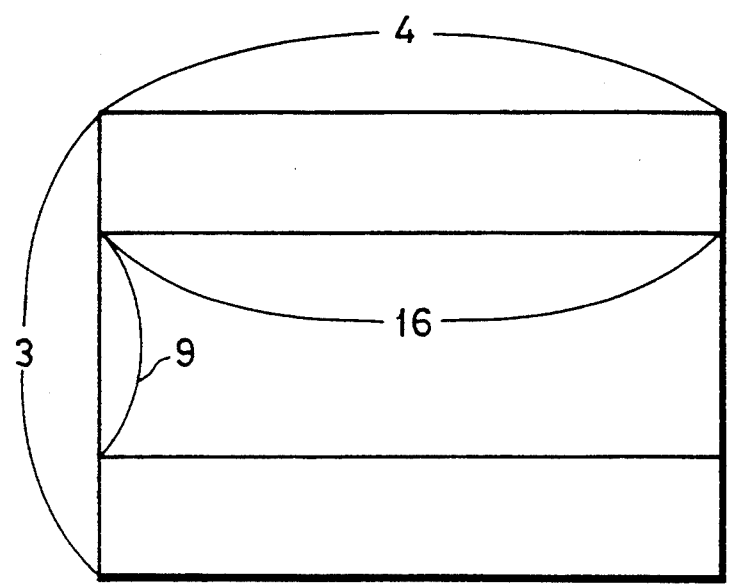
FIG. 11 is a diagram showing the effective screen of a CRT.

The viewfinder 111 has a CRT of 4:3 aspect ratio as shown in FIG. 11. If the identification signal detector 112 does not detect the identification of 16:9 aspect ratio at a predetermined line number during the vertical blanking period of the viewfinder video signal, the reproduced image of 4:3 aspect ratio is directly displayed on the CRT. If the 16:9 aspect ratio identification signal is detected, the vertical deflection circuit is controlled so that the vertical amplitude of the image is reduced to ¾ as small as that of the original image, so that a reproduced image of 4:3×¾, or 16:9 is displayed on the CRT as shown in FIG. 11.

The digital composite color video signal of 36 MHz sampling frequency and of 16:9 aspect ratio from the digital encoder 102 shown in FIG. 1 is supplied to a D/A converter 118 by which it is converted into an analog signal. The analog composite color video signal is supplied through a low-pass filter 119 of 36-MHz cutoff frequency to an adder 120, where it is selectively added to the character signal from the low-pass filter/attenuator 116 that is fed through the on-off switch 121. This adder 120 produces the analog composite color video signal (VBS) of 16:9 aspect ratio.

Another part of the embodiment will be described with reference to FIG. 3. Shown at 126 is a timebase converter, or a FIFO (First-In, First-Out) memory of the asynchronous writing and reading type. This memory includes four FIFO memory elements 127a through 127d and a FIFO control circuit 128. This control circuit controls the four FIFO memory elements 127a through 127d to write and read, 36-MHz and 27-MHz clock signals to be selectively fed to the FIFO memory element 127a, and 18-MHz and 13.5 MHz clock signals to be selectively fed to the other three FIFO memory elements 127b through 127d.

Figure 12:
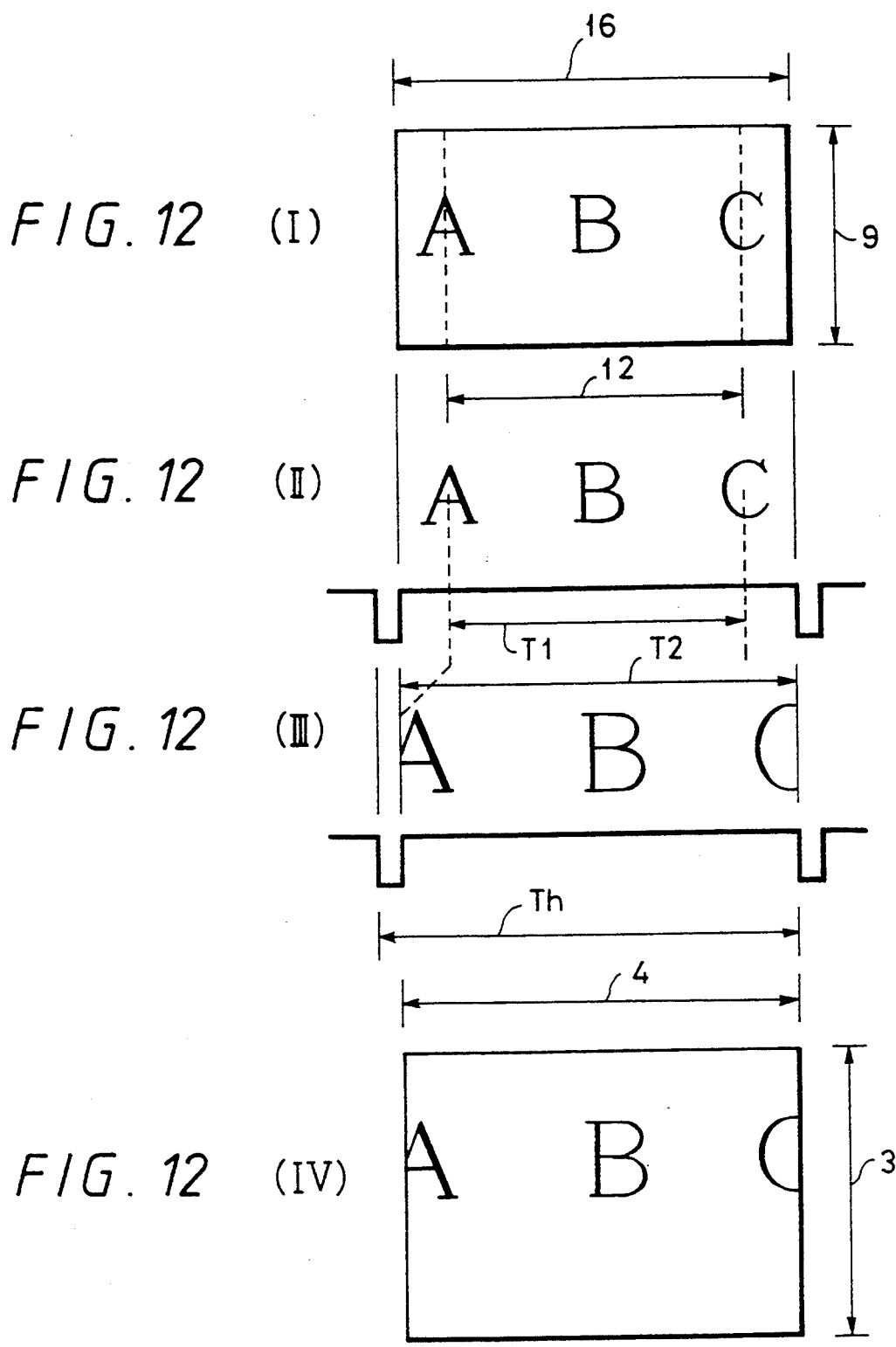
FIG. 12 is a diagram showing the conversion of a 16:9 aspect ratio video signal into a 4:3 aspect ratio video signal.
Figure 13:
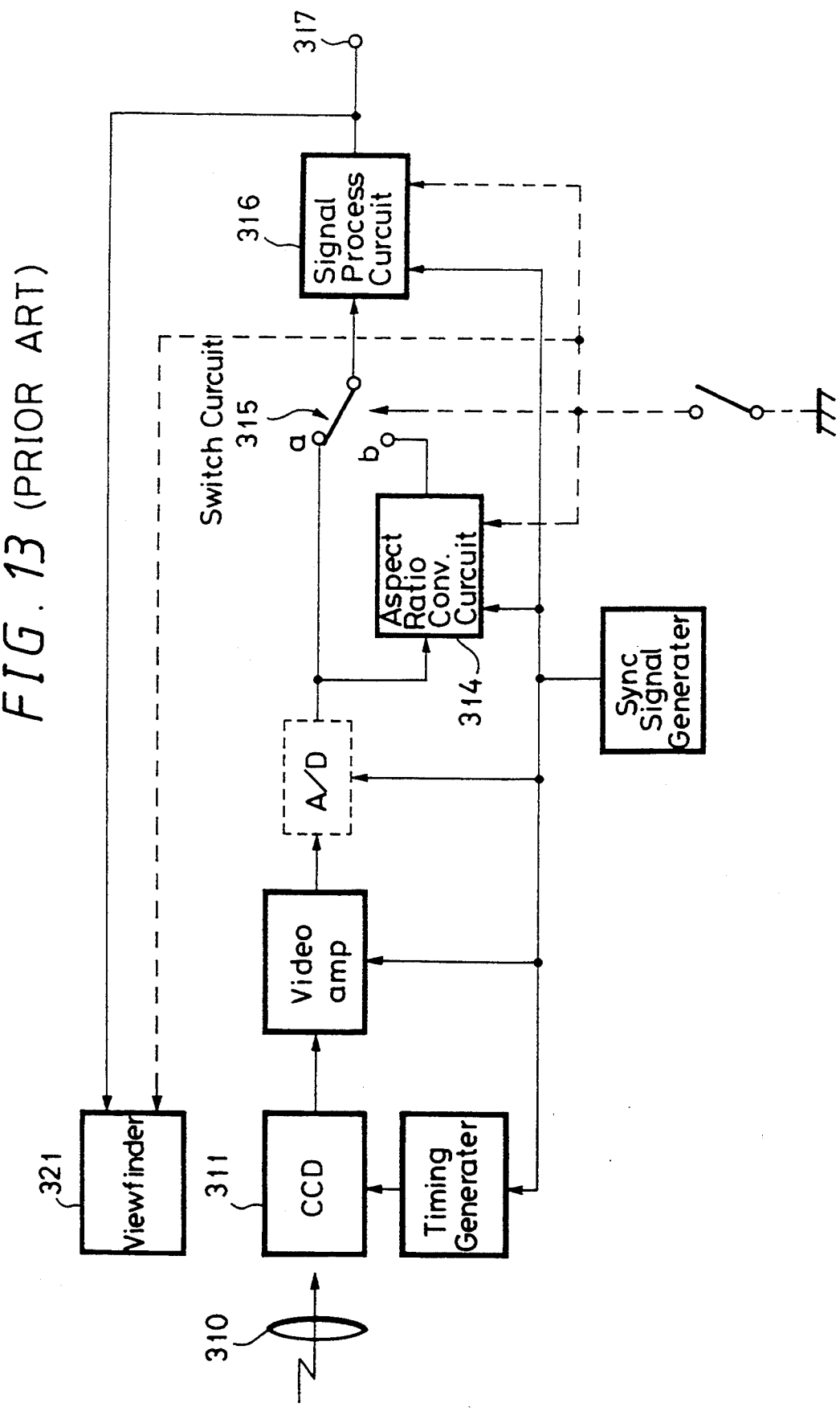
FIG. 13 is a block diagram of a prior art video camera circuit.

The detail signal (DTL) of 16:9 aspect ratio of, for example, the image shown in FIG. 12(I) from the digital signal processor 101 shown in FIG. 1 is written in the FIFO memory element 127a at the 36-MHz clock signal from the FIFO control circuit 128. The luminance signal (Y), red color difference signal (R-Y) and blue color difference signal (B-Y) of the 16:9 aspect ratio image shown in FIG. 12 (I) from the signal processor 101 are written in the FIFO memory elements 127b through 127d at the 18-MHz clock signal from the FIFO control circuit 128.

The video interval of each line signal of the detail signal (DTL) shown in FIG. 12(I) and which is stored in the FIFO memory element 127a is cut off at the rate of 12/16 as shown in FIG. 12(II). Each cut video interval is read therefrom at the 27-MHZ clock signal from the FIFO control circuit 128 so that its timebase can be extended at the rate of 16/12 as shown in FIG. 12 (III). Similarly, the video interval of each line of the luminance signal (Y), red color difference signal (R-Y) and blue color difference signal (B-Y) stored in the FIFO memory elements 127b through 127d is cut off at the rate of 12/16 as shown in FIG. 12(II). Each cut video interval is read therefrom at the 13.5-MHz clock signal from the FIFO control circuit 128 so that its time base can be extended at the rate of 16/12 as shown in FIG. 12(III).

Thus, the FIFO memory elements 127a through 127d produce the detail signal (DTL), luminance signal (Y), red color difference signal (R-Y) and blue color difference signal (B-Y) of 4:3 aspect ratio as shown in FIG. 12 (IV), respectively. These signals are supplied to a digital encoder 129, thereby encoded so that it produces a high-resolution composite color video signal, and high-resolution luminance signal (Y), red color difference signal (R-Y) and blue color difference signal (B-Y). These signals are converted into analog signals by a D/A converter 130. The analog signals are supplied to a low-pass filter 131 of which the cutoff frequency is 27 MHz, so that the high-frequency components are removed. The low-pass filter thus produces the analog composite color video signal (VBS), luminance signal (Y), red color difference signal and blue color difference signal (B-Y) of 4:3 aspect ratio high-resolution. The luminance signal (Y) is further supplied to an adder 132, where it is added with the horizontal and vertical synchronizing signals and color burst signal.

This will be generally described below. The wide aspect ratio video signals from imaging devices (CCDs) having a wider aspect ratio (X:Y) than the standard aspect ratio (x:y) are supplied to the FIFO memory 126.

The FIFO memory 126 extracts a period xY/yX from the video interval of each line signal of the wide aspect ratio video signals which are fed from the imaging devices and then extends the timebase to yX/xY times the original timebase so as to produce the standard aspect ratio video signals.

The FIFO memory 126 is capable of bidirectional operation, that is, it has the ability to convert the 4:3 aspect ratio video signal from a digital VTR (not shown) into the 16:9 aspect ratio video signal as will be described later.

The luminance signal (Y), red color difference signal (R-Y) and blue color difference signal (B-Y) of 16:9 aspect ratio from the digital signal processor 101 shown in FIG. 1 are supplied to an identification signal adding circuit 122. The identification signal indicating the 16:9 aspect ratio is added to a predetermined line number during the vertical blanking period of the luminance signal (Y). The output therefrom is supplied to D/A converters 123, thereby converted into analog signals. The analog signals are supplied to low-pass filters 124 of which the cutoff frequency is 18 MHz, so that the high-frequency components are removed. The low-pass filters thus produce an analog luminance signal (Y), analog red color difference signal (R-Y) and blue color difference signal (B-Y) of 16:9 aspect ratio. The luminance signal (Y) is further supplied to the adder 125, where it is added with the horizontal and vertical synchronizing signals and the color burst signal.

Figure 4:
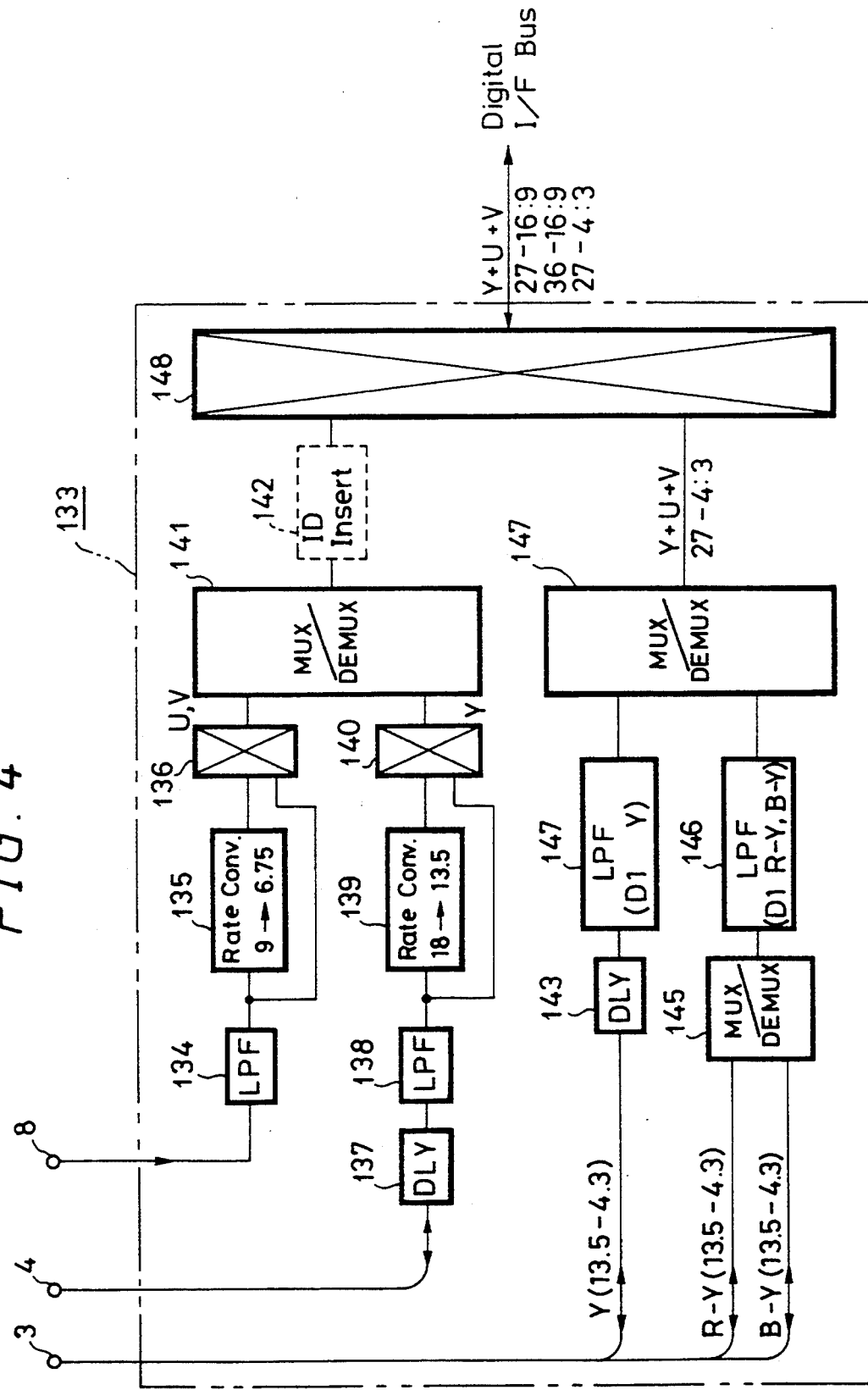
FIG. 4 is a block diagram of still another part of the embodiment of FIG. 1.

The circuit arrangement shown in FIG. 4 will be described below. Shown at 133 is a bidirectional circuit of which the left terminals are connected to the FIFO memory elements 127b through 127d and to the digital signal processor 101, and of which the right terminal is connected through a digital interface bus to the digital VTR (not shown). The respective circuit elements constituting the bidirectional circuit 133 are capable of the bidirectional operation and have different constants depending on the direction.

The operation of the bidirectional circuit 133 in the record mode of the digital VTR will be described first. The luminance signal (Y) of 16:9 aspect ratio and 18-MHz sampling frequency from the digital signal processor 101 is supplied through a delay element 137 and a low-pass filter 138 to a switching circuit 140. Also the output from the low-pass filter is supplied through a rate converter 139, by which it is converted from a signal of 18-MHz sampling frequency to a signal of 13.5-MHz sampling frequency. The output from the converter is supplied to the switching circuit 140. The output from the switching circuit 140 is supplied to a multiplexer/demultiplexer 141.

The multiplexed red color difference signal (R-Y) and multiplexed blue color difference signal (B-Y) of 9-MHz sampling frequency and 16:9 aspect ratio from the digital encoder are supplied through a low-pass filter 134 to a rate converter 135, thereby converted from a signal of 9-MHz sampling frequency to a signal of 6.75-MHz sampling frequency. The output signal from the low-pass filter 134 is supplied to a switching circuit 136, and the output from the switching circuit 136 is supplied to the multiplexer/demultiplexer 141. The multiplexer/demultiplexer 141 thus produces a time-sharing multiplex signal (Y+U+D) of 27-MHz or 36-MHz sampling frequency and 16:9 aspect ratio. The identification signal indicating the 16:9 aspect ratio is added at a predetermined line number during the vertical blanking period of the luminance signal (Y) by an identification signal adding circuit 142.

Figure 3:
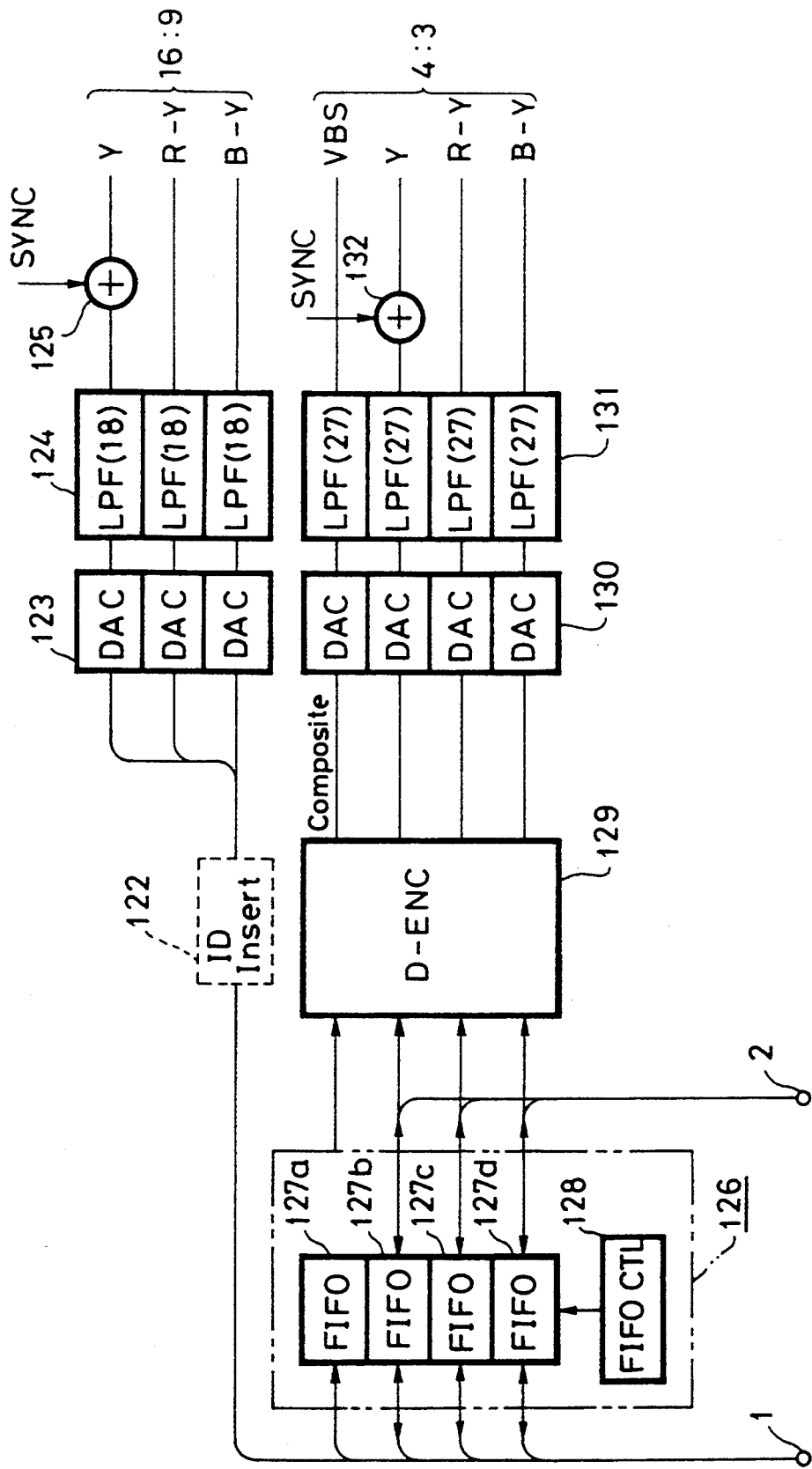
FIG. 3 is a block diagram of another part of the embodiment of FIG. 1.

The luminance signal (Y) of 13.5-MHz sampling frequency and 4:3 aspect ratio from the FIFO memory element 127b shown in FIG. 3 is supplied through a delay element 143 and a low-pass filter ( or low-pass filter for the luminance signal from the D-1 format digital VTR) 144 to a multiplexer/demultiplexer 147. The red color difference signal (R-Y) and blue color difference signal (B-Y) of 13.5-MHz sampling frequency and 4:3 aspect ratio from the FIFO memory elements 127c and 127d shown in FIG. 3 are supplied to the multiplexer/demultiplexer 147 through a multiplexer/demultiplexer 145 and a low-pass filter (or low-pass filter for red color difference signal and blue color difference signal from the D-1 format digital VTR) 146. The multiplexer/demultiplexer 147 produces a time-sharing multiplex signal (Y+U+V) of 27-MHz sampling frequency and 4:3 aspect ratio, and supplies it to the switching circuit 148.

The switching circuit 148 produces a selected one of the time-sharing multiplex signals; (Y+U+V) of 36-MHz sampling frequency and 16:9 aspect ratio, the time-sharing multiplex signal (Y+U+V) of 27-MHz sampling frequency and 16:9 aspect ratio and the time-sharing multiplex signal (Y+U+V) of 27-MHz sampling frequency and 4:3 aspect ratio, and supplies it through a digital interface to the digital VTR where it is recorded.

The operation of the bidirectional circuit 133 in the reproduce mode of the digital VTR will be described below. One of the time-sharing multiplex signals (Y+U+V) of 36-MHz sampling frequency and 16:9 aspect ratio, the time-sharing multiplex signal (Y+U+V) of 27-MHz sampling frequency and 16:9 aspect ratio and the time-sharing multiplex signal (Y+U+V) of 27-MHz sampling frequency and 4:3 aspect ratio is supplied through a digital interface to the switching circuit 148.

The time-sharing multiplex signal (Y+U+V) of 27-MHz sampling frequency and 16:9 aspect ratio from the switching circuit 148 is supplied through the identification signal adding circuit 142 to the multiplexer/demultiplexer 141, and is thereby separated into the luminance signal (Y), multiplexed red color difference signal (R-Y) and multiplexed blue color difference signal (B-Y). The luminance signal (Y) is supplied through the switching circuit 140 to the rate converter 139, and is thereby converted from a signal of 13.5-MHz sampling frequency to a signal of 18-MHz sampling frequency. Then, the output from the converter is supplied through the low-pass filter 138 and delay element 137 to the digital encoder 102. The multiplexed red color difference signal (R-Y) and the multiplexed blue color difference signal (B-Y) are supplied through the switching circuit 136 to the rate converter 135, and are thereby converted from a signal of 6.75-MH sampling signal to a signal of 9-MHz sampling signal. The output from the converter is supplied through the low-pass filter 134 to the digital encoder 102.

The time-sharing multiplex signal (Y+U+V) of 36-MHz and 16:9 aspect ratio from the switching circuit 148 is supplied through the identification signal adding circuit 142 to the multiplexer/demultiplexer 141, and is thereby separated into the luminance signal (Y), multiplexed red color difference signal (R-Y) and multiplexed blue color difference signal (B-Y). The luminance signal (Y) is supplied through the switch circuit 140, low-pass filter 138 and delay element 137 to the digital encoder 102. The multiplexed red color difference signal (B-Y) and multiplexed blue color difference signal (B-Y) are supplied through the switching circuit 136 and the low-pass filter 134 to the digital encoder 102.

The time-sharing multiplex signal (Y+U+V) of 27-MHz and 4:3 aspect ratio from the switching circuit 148 is supplied to the multiplexer/demultiplexer 147, and is thereby separated into the luminance signal (Y), multiplexed blue color difference signal (R-Y), and multiplexed blue difference signal (B-Y). The luminance signal (Y) of 13.5-MHz sampling frequency and 4:3 aspect ratio obtained through the low-pass filter 144 and delay element 143 is supplied to the digital encoder 129 shown in FIG. 3, and to the FIFO memory element 127b so that its timebase is compressed at the rate of 12/16. After the aspect ratio is converted into 4:3, the luminance signal (Y) is supplied to the digital encoder 102 shown in FIG. 1, and supplied through the identification signal adding circuit 122 to the D/A converter 123.

The multiplexed red color difference signal (R-Y) and multiplexed blue color difference signal (B-Y) are supplied through the low-pass filter 146 to the multiplexer/demultiplexer 145. The red color difference signal (R-Y) and blue color difference signal (B-Y) of 13.5-MHz sampling frequency and 4:3 aspect ratio from the multiplexer/demultiplexer are supplied to the digital encoder 129 and to the FIFO memory elements 127c, 127d shown in FIG. 3, and are thereby compressed at 12/16 in their timebase so that they are converted into the red color difference signal (R-Y) and blue color difference signal (B-Y) of 4:3 aspect ratio. Then, these color difference signals are supplied to the digital encoder 102 shown in FIG. 1, and through the identification signal adding circuit 122 to the D/A converter 123.

A video camera of a second embodiment of the invention will be described with reference to FIGS. 5 through 8. FIGS. 5 to 8 show the second four sections of the video camera of the embodiment. All or some of terminals 11 to 19 are provided at the various circuit sections shown in FIGS. 5 to 8. The terminals represented by the same reference numerals are connected to each other. While the two digital encoders 102 and 129 are provided in the first embodiment, one common digital encoder 233 is provided in this second embodiment.

Figure 5:
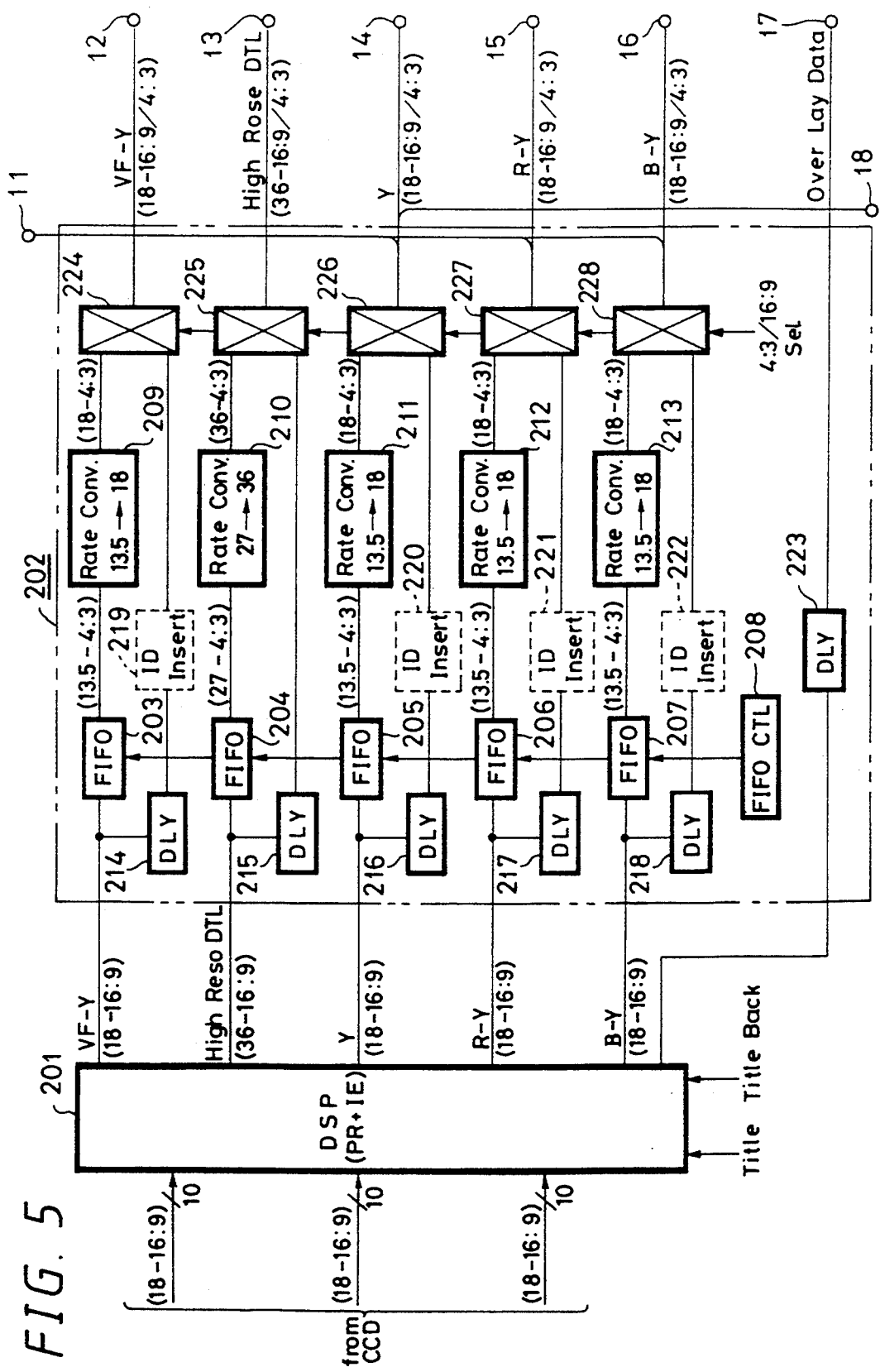
FIG. 5 is a block diagram of part of a second embodiment of the invention.

The section shown in FIG. 5 will be describe first. The picked-up signals from imaging devices of 16:9 aspect ratio, not shown, for example, red, green and blue CCDs are supplied to A/D converters, and are thereby converted into digital red, green and blue signals R, G, B of 18-MHz sampling frequency. These signals are supplied to a digital signal processor (DSP) 201, where they undergo signal processing (PR) and image enhancement processing (IE). This processor 201 is supplied with the digital title signal (Title) and digital title back signal (Title Back). The processor 201 produces:

(1) the digital viewfinder luminance signal (VF-Y) of 18-MHz sampling frequency and 16:9 aspect ratio;
(2) the digital high-resolution detail signal (DTL) of 36-MHz sampling frequency and 16:9 aspect ratio;
(3) the digital luminance signal (Y) of 18-MHz sampling frequency and 16:9 aspect ratio;
(4) the digital red color difference signal (R-Y) of 18-MHz sampling frequency and 16:9 aspect ratio;

(5) digital blue color difference signal (B-Y) of 18-MHz sampling frequency and 16:9 aspect ratio; and (6) digital overlay signal (Over Lay Data). These signals are supplied to a circuit 202.

The digital viewfinder luminance signal (VF-Y) of 18-MHz sampling frequency and 16:9 aspect ratio is supplied through a delay element 214 to an identification signal adding circuit 219, where an aspect ratio identification signal indicating that the aspect ratio is 16:9 is added to a predetermined line number of its vertical blanking period. Then, the identification added signal is supplied to a switching circuit 224. The digital high-resolution detail signal (DTL) of 36-MHz sampling frequency and 16:9 aspect ratio is supplied through a delay element 215 to a switching circuit 225. The digital luminance signal (Y) of 18-MHz sampling frequency and 16:9 aspect ratio is supplied through a delay element 216 to an identification signal adding circuit 220, where an aspect ratio identification signal indicating that the aspect ratio is 16:9 is added to a predetermined line number of its vertical blanking period. The identification added signal is supplied to a switching circuit 226. The digital red color difference signal (R-Y) of 18-MHz sampling frequency and 16:9 aspect ratio is supplied through a delay element 217 to an identification signal adding circuit 221, where an aspect ratio identification signal indicating that the aspect ratio is 16:9 is added to a predetermined line number of its vertical blanking period. This identification added signal is supplied to a switching circuit 227. The digital blue color difference signal (B-Y) of 18-MHz sampling frequency and 16:9 aspect ratio is supplied through a delay element 218 to an identification signal adding circuit 222, where an aspect ratio identification signal indicating that the aspect ratio is 16:9 is added to a predetermined line number of its vertical blanking period. This identification added signal is supplied to a switching circuit 228. The digital overlay signal (Over Lay Data) is supplied through a delay element 223 to a digital encoder 233 which will be described with reference to FIG. 7.

Shown at 203 through 207 are timebase converting means, or FIFO memory elements of asynchronuous writing and reading type. A FIFO control circuit 208 controls the FIFO memory elements 203 through 207 to write and produces read and clock signals to be selectively supplied.

The digital viewfinder luminance signal (VF-Y) of 18-MHz sampling frequency and 16:9 aspect ratio, digital high-resolution detail signal (DTL) of 36-MHz sampling frequency and 16:9 aspect ratio, digital luminance signal (Y) of 18-MHz sampling frequency and 16:9 aspect ratio, digital red color difference signal (R-Y) of 18-MHz sampling frequency and 16:9 aspect ratio, and digital blue color difference signal (B-Y) of 18-MHz sampling frequency and are 16:9 aspect ratio are supplied to the FIFO memory elements 203 through 207, and stored therein in response to the clock signal of 18-MHz [or 36-MHz only for the digital high-resolution detail signal (DTL)] from the FIFO control circuit 208.

An arbitrary video interval, 12/16 is cut away, as shown in FIG. 12(II), from each line signal of the digital viewfinder luminance signal (VF-Y) of 18-MHz sampling frequency and 16:9 aspect ratio, digital high-resolution detail signal (DTL) of 36 MHz sampling frequency and 16:9 aspect ratio, digital luminance signal (Y) of 18-MHz sampling frequency and 16:9 aspect ratio, digital red color difference signal (R-Y) of 18-MHz sampling frequency and 16:9 aspect ratio, and digital blue color difference signal (B-Y) of 18-MHz sampling frequency and 16:9 aspect ratio stored in the FIFO memory elements 203 through 207 as shown in FIG. 12(I). Each cut video interval is read in response to the clock signal of 13.5 MHz [or 27-MHz only for the digital high-resolution detail signal (DTL)] from the FIFO control circuit 208 so that its timebase can be extended at the rate of 16/12 as shown in FIG. 12(III). Then, these signals are supplied to rate converters (including interpolation filters) 209 through 213, by which the sampling frequency is converted from 13.5 MHz [or 27 MHz only for the digital high-resolution detail signal (DTL)] into 18 MHz [(or 36 MHz only for the digital high-resolution detail signal (DTL)]. Thus, the rate converters produce the viewfinder digital luminance signal (VF-Y) of 4:3 aspect ratio, digital high-resolution detail signal (DTL), digital luminance signal (Y), digital red color difference signal (R-Y) and digital blue color difference signal (B-Y), and supplies them to switching circuits 224 through 228, respectively. The switching circuits 224 through 228 are responsive to a switching control signal (4:3/16:9 sel.).

Figure 6:
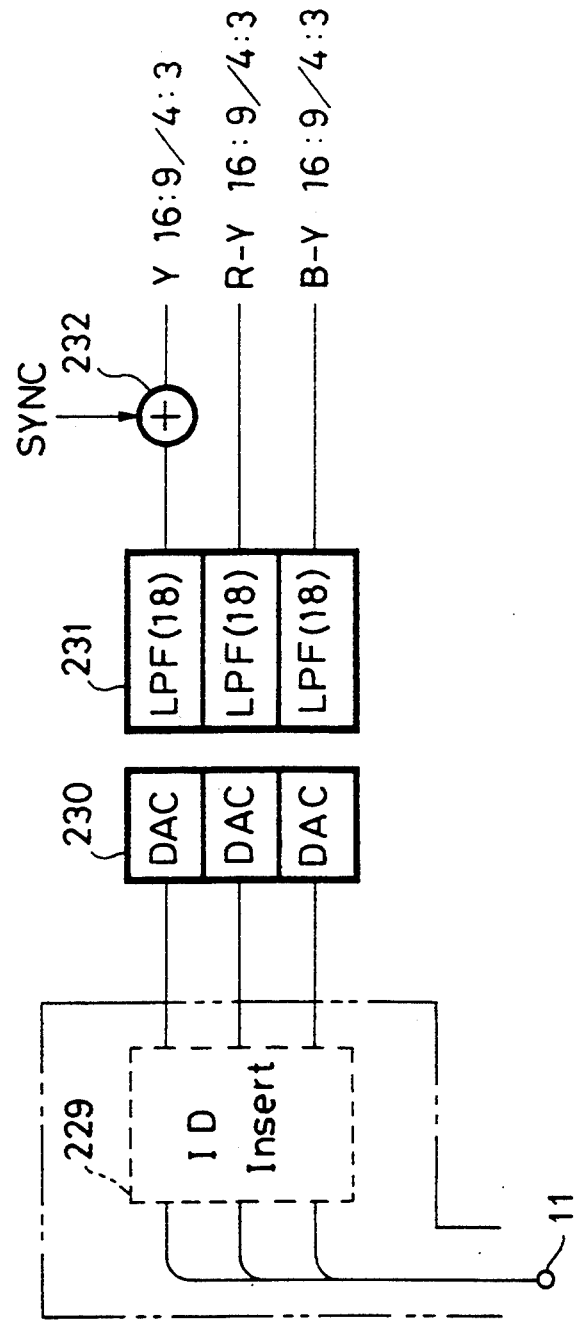
FIG. 6 is a block diagram of another part of the embodiment of FIG. 5.

Another section of the second embodiment to will be described with reference to FIG. 6. The digital luminance signal (Y), digital red color difference signal (R-Y) and digital blue difference signal (B-Y) of 4:3 or 16:9 aspect ratio and 18-Mhz sampling frequency from the switching circuits 226 through 228 shown in FIG. 5 are supplied to an identification signal adding circuit 229, where, when the aspect ratio is 16:9, an identification signal indicating that the aspect ratio is 16:9 is added to a predetermined line number of the vertical blanking period of each signal. The identification added signals are supplied to a D/A converter 230, and are thereby converted into analog signals. Then, the analog signals are supplied to a low-pass filter 231 of which the cutoff frequency is 18 MHz, so that the high-frequency components are removed. Thus, the filter produces the analog luminance signal (Y), analog red color difference signal (R-Y) and analog blue color difference signal (B-Y) of 4:3 or 16:9 aspect ratio. The luminance signal (Y) is supplied to an adder 232, where it is added with the horizontal and vertical synchronizing signals and color burst signal. Another section of the second embodiment will be described with reference to FIG. 7. The viewfinder digital luminance signal (VF-Y), digital high-resolution detail signal (DTL), digital luminance signal (Y), digital red color difference signal (R-Y) and digital blue color difference signal (B-Y) of 18-MHz sampling frequency and 4:3 or 6:9 aspect ratio, and the digital overlay signal (Over Lay Data) from the delay element 223 are supplied to a digital encoder 233. The digital encoder 233 produces the viewfinder digital video signal (VF Video) and digital marker signal (Marker) of 18-MHz sampling frequency and 16:9 or 4:3 aspect ratio, and a test output digital composite color video signal (Composite) of 36-MHz sampling frequency and 16:9 aspect ratio.

The digital encoder 233 has identification signal adding circuits 234 and 235 by which an aspect ratio identification signal of one bit indicating that the aspect ratio is 16:9 is added to a predetermined line number of each vertical blanking period of the luminance signal (VF-Y) and (Y).

The viewfinder digital video signal (VF Video) from the digital encoder 233 is supplied to a D/A converter 236, and is thereby converted into an analog signal. The viewfinder analog video signal is supplied through a low-pass filter 237 of which the cutoff frequency is 18 MHz and through a change-over switch 238 to an adder 239. The marker signal (Marker) from the digital encoder 233 is supplied to an OR gate 244, and a digital character signal from an external character signal generator (not shown) is also supplied to the OR gate 244. The character signal from the output of the OR gate is supplied through a low-pass filter/attenuator 245 and an on-off switch 246 to the adder 239, where it is added to the output signal from the change-over switch 238. A return video signal (a broadcasting video signal or a reproduced signal from a VTR or the like) of 16:9 or 4:3 aspect ratio is selected by a change-over switch 241 and then supplied through an on-off switch 240 to the adder 239. The output from the adder 239 is supplied to a viewfinder (for example, a CRT receiver) 242. The viewfinder 242 includes an identification signal detector 243 which detects the presence and absence of an identification signal for 16:9 aspect ratio.

When the identification signal for 16:9 aspect ratio is not detected at a predetermined line number of the blanking period of the viewfinder video signal by the identification signal detector 243, the viewfinder 242 controls the image to be directly displayed on the CRT having 4:3 aspect ratio. When the identification signal is detected, the viewfinder controls the vertical deflection circuit for the CRT by deflecting the image substantially at ¾ the original vertical amplitude, and thus a reproduced image of 16:9 aspect ratio can be displayed.

The digital composite video signal of 36-MHz sampling frequency and 16:9 or 4:3 aspect ratio from the digital encoder 233 is supplied to a D/A converter 247, and is thereby converted into an analog signal. The analog composite color video signal is supplied through a low-pass filter 248 of which the cutoff frequency is 36 MHz, to an adder 249, where it is added or not added with a character signal that is fed through an on-off switch 250 from the low-pass filter/attenuator 245. This adder produces the analog composite color video signal (VBS) of 16:9 or 4:3 aspect ratio.

Figure 8:
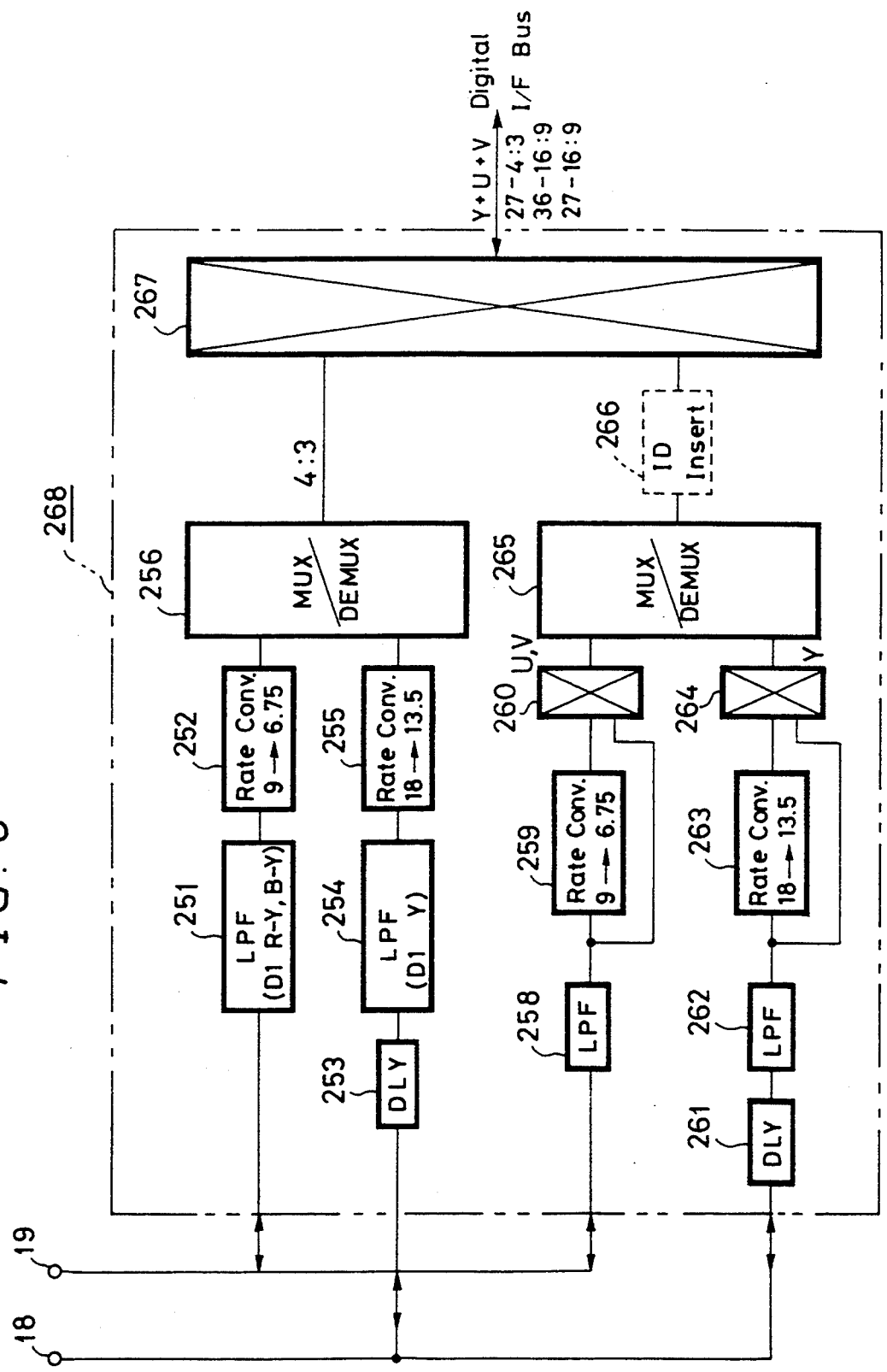
FIG. 8 is a block diagram of still another part of the embodiment of FIG. 5.

Another circuit section of the second embodiment will be described with reference to FIG. 8. Shown at 268 is a bidirectional circuit of which the left side is connected to the switching circuit 226 and digital encoder 233, and of which the right side is connected through a digital interface to the digital VTR (not shown). The circuit elements constituting this bidirectional circuit 268 can be operated in both directions and have different constants depending on the direction.

The bidirectional circuit 268 in the record mode of the digital VTR will be described first. The luminance signal (Y) of 18-MHz sampling frequency and 16:9 aspect ratio from the switching circuit 226 is supplied through a delay element 261 and a low-pass filter 262 to a switching circuit 264 and also to a rate converter 263, by which the sampling frequency is converted from 18 MHz into 13.5 MHz. The output from the rate converter is supplied to the switching circuit 264. The output from the switching circuit 264 is supplied to a multiplexer/demultiplexer 265.

The multiplexed red color difference signal (R-Y) and multiplexed blue color difference signal (B-Y) of 18-MHz sampling frequency and 16:9 aspect ratio from the digital encoder 233 are supplied through a low-pass filter 258 to a rate converter 259, by which the sampling frequency is converted from 9 MHz to 6.75 MHz. The output from the low-pass filter 258 is supplied to a switching circuit 260. The output from the switching circuit 260 is supplied to a multiplexer/demultiplexer 265. This multiplexer/demultiplexer 265 produces a time-sharing multiplex signal (Y+U+D) of 27-MHz or 36-MHz and 16:9 aspect ratio. An identification signal indicating that the aspect ratio is 16:9 is added to a predetermined line number of the vertical blanking period of the luminance signal (Y) by an identification signal adding circuit 266. The output from the identification signal adding circuit is supplied to a switching circuit 267.

Figure 7:
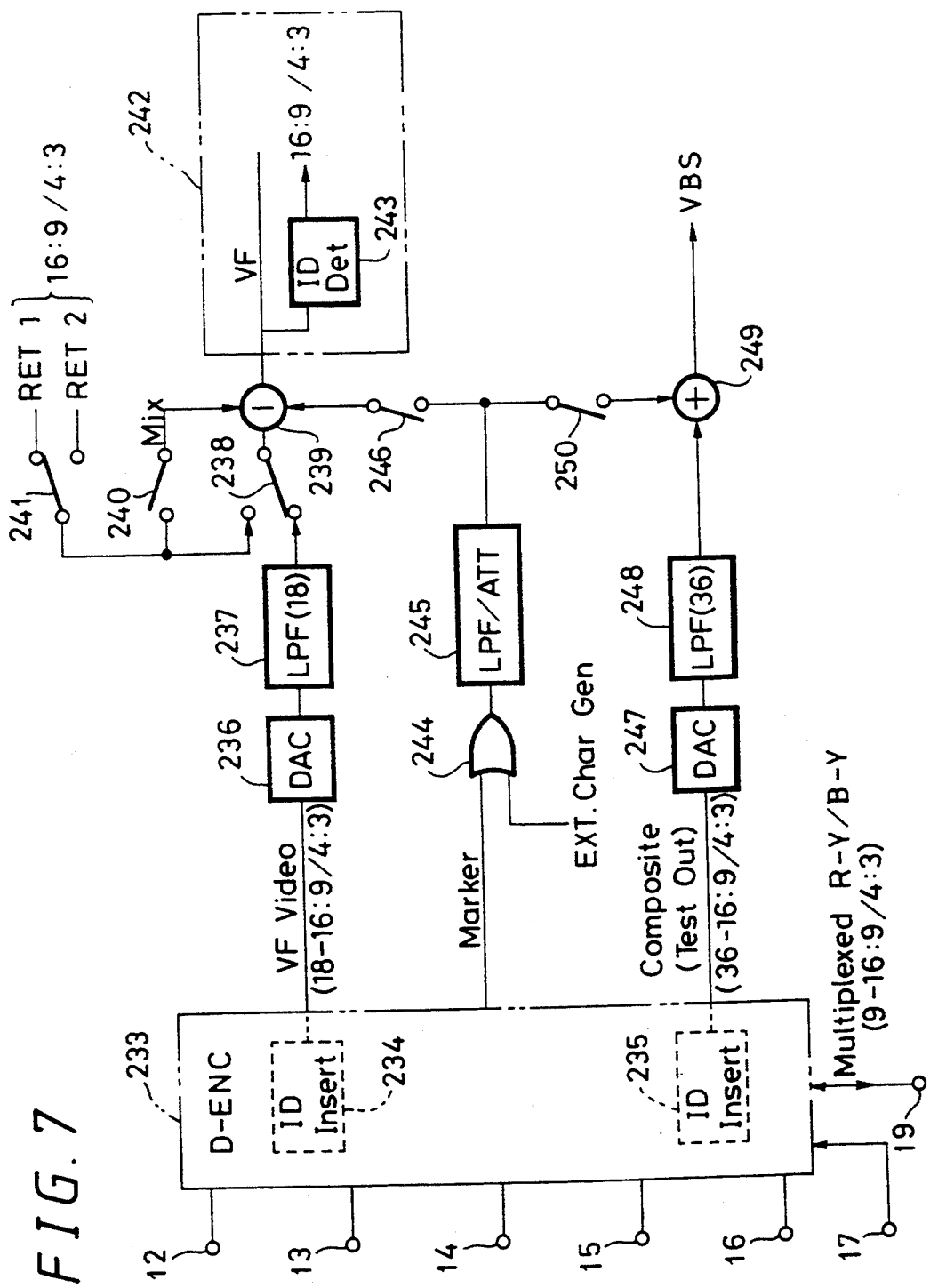
FIG. 7 is a block diagram of another part of the embodiment of FIG. 5.

The luminance signal (Y) of 18-MHz sampling frequency and 4:3 aspect ratio from the switching circuit 266 shown in FIG. 5 is supplied through a delay element 253 and a low-pass filter (low-pass filter for the luminance signal from the D-1 format digital VTR) 254 to a rate converter 255, by which the sampling frequency is converted from 18 MHz to 13.5 MHz, and supplied to the multiplexer/demultiplexer 256. The red color difference/blue color difference signal (R-Y/B-Y) of 18-MHz sampling frequency and 16:9 aspect ratio from the digital encoder 233 shown in FIG. 7 is supplied through a low-pass filter (low-pass filter for red color difference and blue color difference signals) 251 to a rate converter 252, by which the sampling frequency is converted from 9 MHz into 6.75 MHz. The output from the rate converter is supplied to a multiplexer/demultiplexer 256. The multiplexer/demultiplexer 256 produces a time-sharing multiplex signal (Y+U+V) of 27-MHz sampling frequency and 4:3 aspect ratio, and supplies it to a switching circuit 267.

The switching circuit 267 produces a selected one of the time-sharing multiplex signals (Y+U+V) of 36-MHz sampling frequency and 16:9 aspect ratio, time-sharing multiplexed signal (Y+U+V) of 27-MHz sampling frequency and 16:9 aspect ratio, and time-sharing multiplex signal (Y+U+V) of 27-MHz sampling frequency and 4:3 aspect ratio, and supplies the selected one through a digital interface to the digital VTR, where it is recorded.

The operation of the bidirectional circuit 268 in the reproduce mode of the digital VTR will be described below. One of the time-sharing multiplex signals (Y+U+V) of 36-MHz sampling frequency and 16:9 aspect ratio, time-sharing multiplexed signal (Y+U+V) of 27-MHz sampling frequency and 16:9 aspect ratio, and time-sharing multiplex signal (Y+U+V) of 27-MHz sampling frequency and 4:3 aspect ratio is selectively supplied through a digital interface to the switching circuit 267.

The time-sharing multiplex signal (Y+U+V) of 27-MHz sampling frequency and 16:9 aspect ratio from the switching circuit 267 is supplied through the identification signal adding circuit 266 to the multiplexer/demultiplexer 265, thereby separated into the luminance signal (Y), multiplexed red color difference signal (R-Y), and multiplexed blue color difference signal (B-Y). The luminance signal (Y) is supplied through the switching circuit 264 to the rate converter 263, by which the sampling frequency is converted from 13.5 MHz into 18 MHz. The output from the rate converter is supplied through the low-pass filter 262 and delay element 261 to the digital encoder 233. The multiplexed red color difference signal (R-Y) and multiplexed blue color difference signal (B-Y) are supplied through the switching circuit 260 to the rate converter 259, by which the sampling frequency is converted from 6.7 MHz into 9 MHz. The output from the rate converter is supplied through the low-pass filter 258 to the digital encoder 233.

The time-sharing multiplexed signal (Y+U+V) of 36-MHz and 16:9 aspect ratio from the switching circuit 267 is supplied through the identification signal adding circuit 266 to the multiplexer/demultiplexer 265, and is thereby separated into the luminance signal (Y), multiplexed red color difference signal (R-Y) and multiplexed blue color difference signal (B-Y). The luminance signal (Y) is supplied through the switching circuit 264, low-pass filter 262 and delay element 261 to the digital encoder 233. The multiplexed red color difference signal (R-Y) and multiplexed blue color difference signal (B-Y) are supplied through the switching circuit 260 and low-pass filter 258 to the digital encoder 233.

The time-sharing multiplexed signal (Y+U+V) of 27-MHz sampling frequency and 4:3 aspect ratio from the switching circuit 267 is supplied to the multiplexer/demultiplexer 265, and is thereby separated into the luminance signal (Y), multiplexed red color difference signal (R-Y) and multiplexed blue color difference signal (B-Y). The luminance signal (Y) is supplied through the low-pass filter 262 and the delay element 261, and the luminance signal (Y) of 13.5-MHz sampling frequency and 4:3 aspect ratio produced from this delay element is supplied to the digital encoder 233 shown in FIG. 7.

The multiplexed red color difference signal (R-Y), and multiplexed blue color difference signal (B-Y) are supplied through the low-pass filter 284 to the digital encoder 233.

While in the above embodiment the aspect ratio identification signal is added to the video signal of 16:9 aspect ratio, the aspect ratio identification signal may be added to the video signal of 4:3 aspect ratio.

What is claimed is:

1. Video camera apparatus for selectively outputting a video signal of a first aspect ratio and a video signal of a second aspect ratio, comprising;
   imaging means for producing a video signal of said first aspect ratio;
   converting means for converting the first aspect ratio video signal from said imaging means into a video signal of said second aspect ratio;
   identifier adding means for adding an aspect ratio identification signal, indicative of the aspect ratio, to one of the video signals;
   mark adding means for adding to one of the video signals a mark signal indicative of a range in which the second aspect ratio video signal is displayed relative to the first aspect ratio video signal;
   a display for displaying the one of the video signals with the added mark signal; and
   output means for selectively outputting said first and second aspect ratio video signals, wherein said output means includes time-sharing multiplexing means receiving said video signals of said first and second aspect ratios and producing respective first and second multiplexed signals simultaneously therefrom fed to a switching circuit that selectively outputs one of said first and second multiplexed signals of said respective first and second aspect ratios to said display.

2. The apparatus according to claim 1, wherein said mark signal comprises two vertical straight lines indicative of portions corresponding to left and right boundaries of the second aspect ratio video signal displayed on said display.

3. The apparatus according to claim 1, wherein said mark signal comprises a signal for making black a portion of said display representing the video signal of the first aspect ratio minus the video signal of the second aspect ratio.

4. The apparatus according to claim 1, wherein said mark signal comprises a signal for making white a portion of the display representing the video signal of the first aspect ratio minus the video signal of the second aspect ratio.

5. The apparatus according to claim 1, wherein said mark signal comprises a signal for making a portion of the display of the video signal of the first aspect ratio minus the video signal of the second aspect ratio a predetermined color.

6. The apparatus according to claim 1 wherein said first and second aspect ratios are 16:9 and 4:3, respectively.

7. The apparatus according to claim 1, wherein the converting means comprises timebase extending means supplied with said first aspect ratio video signal from said imaging means for extracting a video interval xY/yX from each line signal of said first aspect ratio video signal and extending the timebase by yX/xY times, so as to produce said second aspect ratio video signal.

8. Video camera apparatus for selectively outputting a video signal of a first aspect ratio and a video signal of a second aspect ratio, comprising:
   imaging means for producing a video signal of said first aspect ratio;
   converting means for converting the first aspect ratio video signal from the imaging means into a video signal of said second aspect ratio;
   identifier adding means for adding an aspect ratio identification signal, indicative of the aspect ratio, to one of the video signal of said first aspect ratio and the video signal of said second aspect ratio; and
   output means for selectively outputting one of said video signal having said first aspect ratio and said video signal having said second aspect ratio, wherein said output means includes time-sharing multiplexing means receiving the video signal of said first aspect ratio and the video signal of said second aspect ratio and simultaneously producing respectively therefrom a first multiplexed signal of said first aspect ratio and a second multiplexed signal of said second aspect ratio and a switching circuit for selectively outputting one of said first and second multiplexed signals.

9. The apparatus according to claim 8, wherein said first and second aspect ratios are 16:9 and 4:3, respectively.

10. Video camera apparatus for selectively outputting a video signal of a first aspect ratio and a video signal of a second aspect ratio, comprising:
    imaging means for producing a video signal of said first aspect ratio;
    converting means for converting the first aspect ratio video signal from said imaging means into a video signal of said second aspect ratio;
    mark adding means for adding to the video signal of said second aspect ratio a mark signal indicative of a range over which the second aspect ratio video signal is displayed relative to said first aspect ratio video signal;
    a display for displaying said video signal with the added mark signal; and output means for outputting said first and second aspect ratio video signals wherein the output means comprises a time-sharing multiplexing means receiving said video signals of said first and second aspect ratios and simultaneously producing respective first and second multiplexed signals therefrom fed to a switching circuit that selectively outputs one of said first and second multiplexed signals of said respective first and second aspect ratios to said display.

11. The apparatus according to claim 10, wherein said first and second aspect ratios are 16:9 and 4:3, respectively.

12. Video Camera apparatus for selectively outputting a video signal of 16:9 aspect ratio and a video signal of 4:3 aspect ratio, comprising:

imaging means for producing a video signal of said 16:9 aspect ratio video signal from said imaging means into a 4:3 aspect ratio video signal;

identifier adding means for adding to the video signal of said 16:9 aspect ratio an aspect ratio identification signal of one bit which is indicative of said 16:9 aspect ratio at a predetermined line number of each vertical blanking period of said 16:9 aspect ratio video signal;

mark adding means for adding to the video signal of said 16:9 aspect ratio a mark signal indicative of a range in which said 4:3 aspect ratio video signal is displayed to the luminance signal of said video signal with the added aspect ratio identification signal;

a display for displaying said video signal with the added mark signal; and output means for selectively outputting said 16:9 and 4:3 aspect ratio video signals wherein the output means comprises a time-sharing multiplexing means receiving said video signals of 4:3 and of 16:9 aspect ratios and simultaneously producing respective first and second multiplexed signals therefrom fed to a switching circuit for selectively outputting one of said first and second multiplexed signals of said respective 4:3 and 16:9 aspect ratios to said display.

* * * * *

UNITED STATES PATENT AND TRADEMARK OFFICE
CERTIFICATE OF CORRECTION

PATENT NO. : 5,444,492
DATED : August 22, 1995
INVENTOR(S) : Taku Kihara

It is certified that error appears in the above-indentified patent and that said Letters Patent is hereby corrected as shown below:

```
Col. 1 line 12, change "systems" to --system--
Col. 3, line 48, delete "sampling" second occurence
        line 50, change "over lay" to --overlay--
Col. 4, line 21, delete "black"
Col. 5, line 33, change "MHZ" to --MHz--
        line 50, after "129" insert --of Fig. 3--
Col. 8 line 49, change "describe" to --described--
Col. 10, line 24, delete "to"
         line 45, "Another" should be on line 46, to start a new
                    paragraph
         line 51, change "6:9" to --16:9--
Col. 12, line 55, after "265," insert  --and is--
Col. 13, line 30, change "284" to --258--

Col. 15, line 14, change "Camera" to --camera--
```

Signed and Sealed this

Twenty-eighth Day of January, 1997

Attest:

BRUCE LEHMAN

*Attesting Officer*   *Commissioner of Patents and Trademarks*